United States Patent
Beck et al.

(10) Patent No.: US 10,936,276 B2
(45) Date of Patent: Mar. 2, 2021

(54) CONFIDENTIAL INFORMATION CONCEALMENT

(71) Applicant: Lenovo (Singapore) Pte. Ltd., Singapore (SG)

(72) Inventors: Kevin Wayne Beck, Raleigh, NC (US); Ryan Charles Knudson, Raleigh, NC (US); Russell Speight VanBlon, Raleigh, NC (US); Roderick Echols, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 209 days.

(21) Appl. No.: 15/928,607

(22) Filed: Mar. 22, 2018

(65) Prior Publication Data
US 2019/0294407 A1   Sep. 26, 2019

(51) Int. Cl.
| G06F 3/16 | (2006.01) |
| G06F 3/01 | (2006.01) |
| G10L 25/27 | (2013.01) |
| G10L 25/78 | (2013.01) |

(52) U.S. Cl.
CPC .............. *G06F 3/165* (2013.01); *G06F 3/016* (2013.01); *G10L 25/27* (2013.01); *G10L 25/78* (2013.01)

(58) Field of Classification Search
CPC ......... G10L 21/00; G10L 25/27; G10L 25/78; G06F 3/165; G06F 3/016; G06F 17/30; G06F 21/10; G06F 21/84

USPC ......................................................... 704/273
See application file for complete search history.

(56) References Cited

U.S. PATENT DOCUMENTS

| 9,104,886 B1* | 8/2015 | Dolbakian | G06F 21/62 |
| 10,025,952 B1* | 7/2018 | Wang | G06F 21/6245 |
| 2004/0015262 A1* | 1/2004 | Brown | H04L 63/10 700/207 |
| 2009/0210940 A1* | 8/2009 | Dean | G06F 21/35 726/19 |
| 2012/0290943 A1* | 11/2012 | Toney | G06F 3/0481 715/751 |
| 2016/0315923 A1* | 10/2016 | Riscombe-Burton | H04L 63/18 |
| 2017/0289766 A1* | 10/2017 | Scott | H04W 4/023 |
| 2018/0276395 A1* | 9/2018 | Bostick | H04L 65/403 |
| 2018/0285592 A1* | 10/2018 | Sharifi | G06F 21/84 |
| 2018/0288380 A1* | 10/2018 | Raffa | G10L 25/78 |

* cited by examiner

*Primary Examiner* — Michael Colucci
(74) *Attorney, Agent, or Firm* — Ference & Associates LLC

(57) ABSTRACT

One embodiment provides a method, including: receiving, at an information handling device, an indication to provide output; identifying that the output comprises confidential information; determining, using a processor, that the output may be heard by at least one other user; and altering, responsive to the determining, the output to conceal the confidential information. Other aspects are described and claimed.

20 Claims, 3 Drawing Sheets

CONFIDENTIAL INFORMATION CONCEALMENT

BACKGROUND

Information handling devices ("devices"), for example smart phones, tablet devices, smart speakers, laptop and personal computers, and the like, may be capable of receiving command inputs and providing outputs responsive to the inputs. Generally, a user interacts with a voice input module, for example embodied in a personal assistant through use of natural language. This style of interface allows a device to receive voice inputs from a user (e.g., queries, commands, etc.), process those inputs, and provide audible outputs according to preconfigured output settings.

BRIEF SUMMARY

In summary, one aspect provides a method, comprising: receiving, at an information handling device, an indication to provide output; identifying that the output comprises confidential information; determining, using a processor, that the output may be heard by at least one other user; and altering, responsive to the determining, the output to conceal the confidential information.

Another aspect provides an information handling device, comprising: a processor; a memory device that stores instructions executable by the processor to: receive an indication to provide output; identify that the output comprises confidential information; determine that the output may be heard by at least one other user; and alter, responsive to the determining, the output to conceal the confidential information.

A further aspect provides a product, comprising: a storage device that stores code, the code being executable by a processor and comprising: code that receives an indication to provide output; code that identifies that the output comprises confidential information; code that determines that the output may be heard by at least one other user; and code that alters, responsive to the determining, the output to conceal the confidential information.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
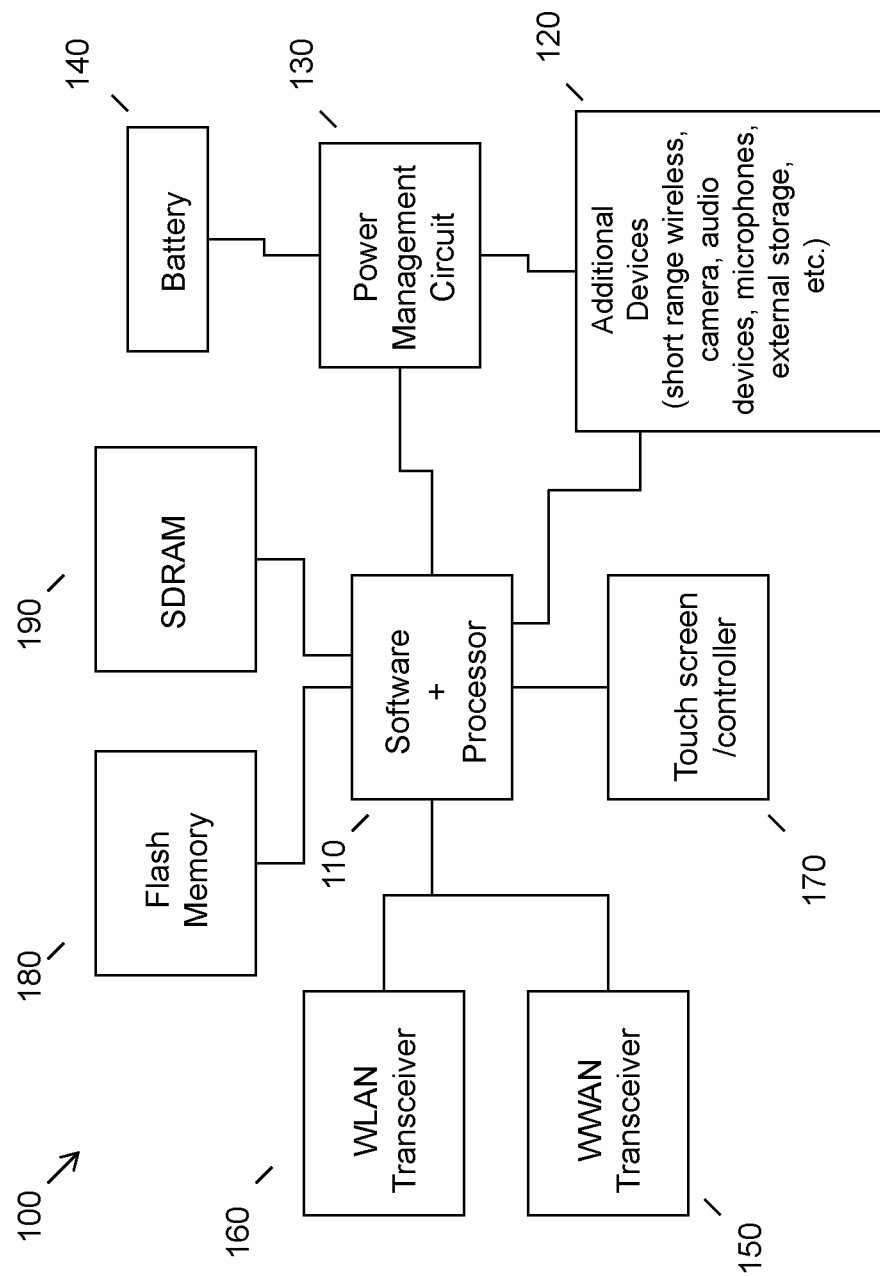
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, etc.).

Conventionally, digital assistants identify information that corresponds to a user command or query and then provide that information in an output response to a user. Oftentimes, the identified information may be information that a user does not want other individuals to hear or see (e.g., the information may be very personal, private, confidential, embarrassing, etc.). In situations where the confidential information is broadcast to other individuals, the user may find themselves in an uncomfortable position. Additionally, depending on the context of the information, the user may also be violating various privacy policies (e.g., company privacy policies, client privacy policies, etc.) if the confidential information is disclosed to unauthorized individuals.

One existing solution is for a user to move to a private location to receive the response output. However, this would require a user to physically move from their current location, which may be burdensome. Additionally, in some situations, a private location may not be available. Furthermore, a user may not realize that the information being output is confidential until the information is already broadcast. Another existing solution may allow a device to dynamically adjust its output volume to mirror the input volume of a user command. For example, if a user provides an audible command in a whispered tone, the output may be provided at similar low-volume levels. However, a user may find it burdensome to continuously adjust their input volume so that corresponding output is provided at a contextually appropriate volume level. Additionally, if a user is in a noisy environment, they may not be able to hear the low volume response output. As such, no solutions currently exist that dynamically filter the audible responses from a digital assistant based on the user's classification, surrounding context, or preconfigured privacy settings.

Accordingly, an embodiment provides a method for altering an output response to conceal identified confidential information projected to be broadcast in the response. In an embodiment, an indication may be received to provide output (e.g., from a user command, from a scheduled reminder, etc.). An embodiment may thereafter identify that the output comprises confidential information. The identification may be conducted prior to the output being broadcast. An embodiment may then determine whether the output may be heard by at least one other individual at current output response settings. Responsive to determining that the output may be heard by at least one other individual, an embodiment may alter the output to conceal the confidential information. Such a method may enable a user to receive confidential information in such a way that other individuals are not apprised of that information.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
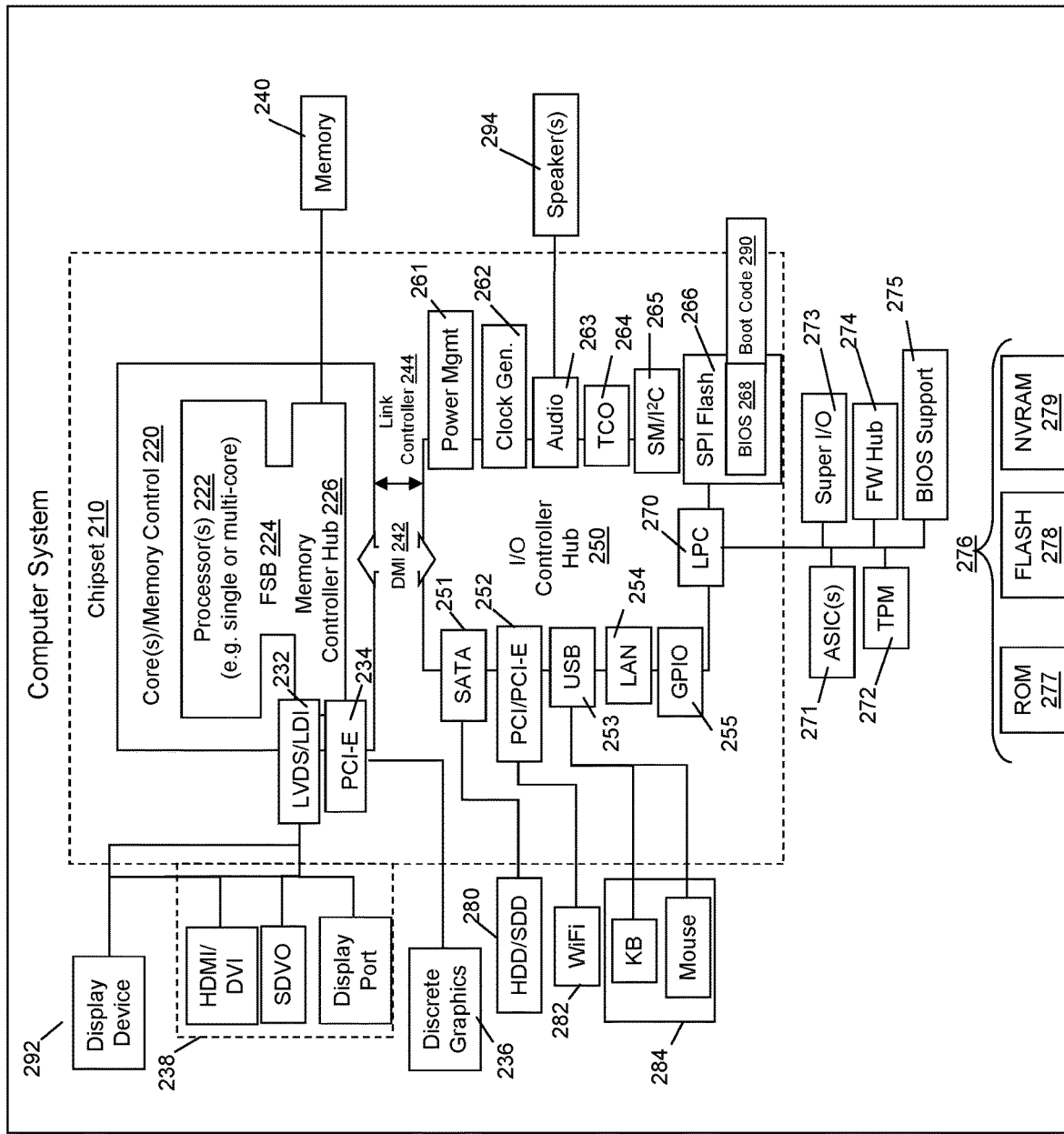
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
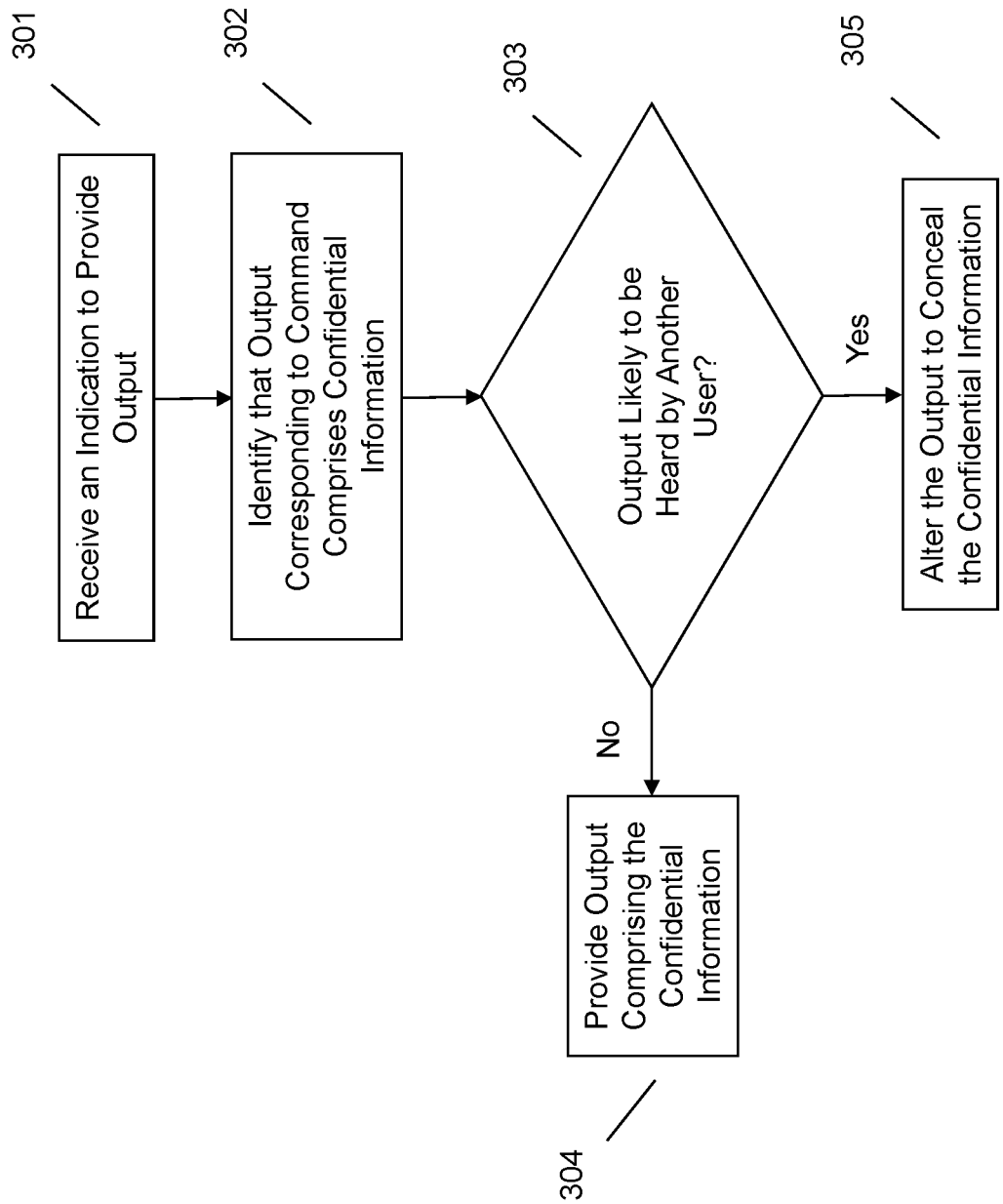
FIG. 3 illustrates an example method of altering output to conceal confidential information.

Referring now to FIG. 3, an embodiment may alter output settings in order to conceal confidential information projected to be present in the output. At 301, an embodiment may receive an indication to provide output at a user device. The indication may result from a scheduled reminder to provide output, from a user command to provide output, a combination thereof, and the like. In an embodiment, the scheduled reminder may be an instruction (e.g., from the user, from a third party, etc.) to the device to provide a particular piece of output at a particular time. For example, a user may instruct their device to provide to them a daily, audible reminder to take their prescription pills.

In an embodiment, the user command may be virtually any command such as an audible command, a gesture command, a keyboard command, a mouse-click command, and the like. For simplicity purposes, the majority of the discussion herein will involve an audible command, however, it should be understood that this is not limiting and other user command types may be used. In an embodiment, the user command may be virtually any command that demands an audible response to be output by the device (e.g., the command may be a search query, a recitation request, an audio file play request, etc.). In an embodiment, the audible command may be received/detected by an input device (e.g., a microphone, an audio capture device, etc.) operatively coupled to or in communication with the user device.

In an embodiment, the input device may be an input device integral to the user device. For example, a smart phone may be disposed with a microphone capable of receiving voice input data. Alternatively, the input device may be disposed on another device and may transmit received voice input data to the user device. For example, voice input may be received at a smart speaker that may subsequently transmit the voice data to another device (e.g., to a user's smartphone for processing, etc.). Voice input data may be communicated from other sources to the user device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the speech recognition device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

At 302, an embodiment may identify that projected output comprises confidential information. For example, responsive to receiving the user command "read me the contents of the most recently received text message" an embodiment may identify that at least a portion of the corresponding output (i.e., at least a portion of the recently received text message) is associated with confidential information that a user does not want publicly broadcast. In an embodiment, confidential information may be any information (e.g., any note, document, audio file, etc.) that is previously designated as confidential by a user. A user may designate information as confidential by using one or more conventional content tagging techniques (e.g., content designation by touch selection, audible selection, mouse selection, etc.). An embodiment may thereafter store a user's confidential designations in an accessible list (e.g., stored locally on the device or remotely on another device or server, etc.). Additionally or alternatively, in another embodiment, various types of information may be tagged as confidential by a manufacturer or programmer. For example, a user's personal notes may always be designated as confidential. These confidential designations may also be stored in an accessible list, which may be the same as or different from the list storing the user-designated confidential information.

In an embodiment, the projected output response may be an audible response, visual response, a combination thereof, and the like. For simplicity purposes, the majority of the discussion herein will involve projected audible output, however, it should be understood that this is not limiting. An embodiment may identify that the audible command comprises confidential information by accessing one or more lists comprising confidential information designations and determining whether at least a portion of the projected corresponding output may be associated with an item in the list(s). In this regard, an embodiment may first develop or determine the corresponding output response and then compare the developed response to the one or more lists. In an embodiment, the identification step may occur prior to provision of any output or, alternatively, may occur prior to provision of the confidential information in the output.

At 303, an embodiment may determine whether the output may be heard by at least one other user. In an embodiment, the determination may involve detecting data associated with the user's surroundings and determining whether at least one other individual is also present in the user's surroundings. Responsive to determining that at least one other individual is present in the user's surroundings, an embodiment may assume that the output may be heard by that individual.

In an embodiment, the data may be context data and the context data may be virtually any kind of data associated with a user's surroundings such as ambient sound data, image or video data, location data, calendar entry data, social media data, proximate individual data (i.e., the detection of other individuals in the user's proximate surroundings), and the like. In an embodiment, the context data may be detected using one or more sensors integral to or in communication with the speech recognition device. For example, sound sensors may be able to capture audio provided in a predetermined space (e.g., a room a user is in, etc.). The captured audio data may thereafter be analyzed to determine whether multiple individuals are providing audible input in that space. In another example, one or more image capture devices (e.g., static cameras, video cameras, etc.) may be able to capture images or videos of the predetermined area. The image data may thereafter be analyzed (e.g., using one or more conventional image analysis techniques, etc.) to determine if additional individuals are in the predetermined area. In a further example, a user's location may be determined using one or more location determining sensors and/or techniques (e.g., using GPS data, identifying a public Wi-Fi connection a user is connected to, etc.). In yet another example, an embodiment may access a user's communications with other individuals, calendar entries, social media information, etc., to determine if a user is in a location that is likely to comprise other individuals. For example, an embodiment may identify that a user has confirmed their attendance at a party lasting from 8 pm-12 am by accessing a user's social media information. Responsive to receiving a user command during this time frame, an embodiment may assume that other individuals are within close proximity to the user.

Although a plurality of examples for detecting context data have been provided, these examples are non-limiting and other types of context data not explicitly elaborated upon here may also be detected. Additionally, virtually any combination of these sensors may be utilized to detect context data.

In an embodiment, even if another individual is determined to be proximate to the user, an embodiment may determine that the output may not be heard, or be comprehendible, by the other individual. For example, an embodiment may identity that another individual is on an opposite side of the room from the user and may not be able to hear or comprehend output provided at current output settings (e.g., at a current volume level, etc.) from that distance.

Responsive to determining, at 303, that a projected output response comprising confidential information may not be heard by another individual, an embodiment may provide, at 304, the output response at existing or default output settings. Conversely, responsive to determining, at 303, that a projected output response comprising confidential information may be heard by another individual, an embodiment may alter, at 305, the output to conceal the confidential information.

In an embodiment, the alteration of the output response may involve adjusting a length of the confidential information in the output. For example, an item of confidential information may be associated with the name, John Smith. An embodiment may adjust the length of the confidential information by abbreviating the name (e.g., to "J.S.", etc.), truncating the full name (e.g., to "John", etc.), performing circumlocution on the name (e.g., "Tim and Ellen's son", etc.), and the like. In an embodiment, the alteration may involve providing the output on an output device personal to the user. For example, an embodiment may provide the output response in visual and/or textual form on a display screen of the user's device (e.g., a user's smart phone, a user's wearable device, etc.). In another embodiment, the output response may be provided using a user's private headphones or headset (if present) instead of on stereo speakers. In yet another embodiment, the output response may be provided using a haptic method (e.g., a vibration pattern on a user's personal or wearable device, a flashing light pattern, etc.). In an embodiment, the alteration may involve recommending to the user to obtain a particular output device (e.g., headphones, etc.) to receive the output response on.

An embodiment may also comprise a feedback and verification mechanism that may ask the user to confirm that the treatment of the output response was appropriate. Subsequent to providing the altered output, an embodiment may query the user to determine if the method used to alter the output response was appropriate. Responsive to receiving confirmation input that the alternation method was appropriate, an embodiment may store a correlation between the alteration method and the content in the output in a database. Responsive to receiving negative feedback, an embodiment may query the user to identify an appropriate alteration method.

In some situations, a user may not mind if certain individuals overheard certain pieces of confidential information. In these situations, an embodiment may first determine whether another individual is proximate to the user (e.g., using the aforementioned methods, etc.), then determine the identity of the individual, and thereafter determine whether the identified individual is authorized to overhear the confidential information. In an embodiment, the identity of proximate individuals may be determined using user identification data. For example, images and/or audio clips of and/or provided by the proximate individuals may be captured and analyzed to determine their identity. In another example, user identification data may be received from devices associated with the proximate individuals (e.g., from their wearable devices, smart phones, etc.) that may provide an indication of their identity. Responsive to determining an individual's identity, an embodiment may determine whether the identified individual is authorized to hear the confidential information. In an embodiment, a user may assign certain "permissions" to various individuals, identifying them to a system as being authorized to hear an item of confidential information. For example, a user may be part of a text messaging group chat. The user may designate all the content associated with that group chat as confidential and may also authorize all members of that group chat to hear any output related to the contents of the group chat. Therefore, if an embodiment receives a user command to "read the last message in the group chat" and determines that another member of that group chat is in proximity to the user, an embodiment may not alter the output.

The various embodiments described herein thus represent a technical improvement to conventional confidential information concealment techniques. Using the techniques described herein, an embodiment may receive an indication to provide output and thereafter identify whether the projected output may comprise confidential information. Additionally, an embodiment may determine whether the output may be heard by at least one other individual. Responsive to making a positive determination, an embodiment may alter the output using one or more methods to conceal the confidential information present in the output. Such techniques may reduce or eliminate the instances in which confidential information is publicly broadcast to unintended or unauthorized individuals.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to provide output to a user;
   identifying that the output comprises confidential information, wherein the confidential information comprises information previously designated as confidential by the user utilizing at least one content tagging technique;
   determining, using a processor, that the output may be heard by at least one other individual determined to be present in the user's surroundings;
   identifying the at least one other individual present in the user's surrounding, wherein the identifying the at least one other individual comprises utilizing identification data to identify the at least one other individual and determining, utilizing permissions assigned to the at least one other individual by the user, if the at least one other individual is authorized to hear the confidential information; and
   altering, responsive to determining, based upon the assigned permissions, the at least one other individual is not authorized to hear the confidential information, the output to conceal the confidential information.

2. The method of claim 1, wherein the indication is associated with at least one of a user command and a scheduled reminder.

3. The method of claim 1, wherein the identifying comprises accessing a stored list comprising a plurality of items of confidential information, and determining that the output comprises at least one item from the plurality of items.

4. The method of claim 1, wherein the determining comprises receiving data associated with the user's surroundings.

5. The method of claim 4, wherein the data comprises at least one item of data selected from the group consisting of audio data, visual data, location data, calendar entry data, social media data, and proximate individual data.

6. The method of claim 1, wherein the altering comprises adjusting a length of the confidential information in the output.

7. The method of claim 1, wherein the altering comprises providing the output on an output device personal to the user.

8. The method of claim 1, wherein the altering comprises providing the output using a haptic pattern.

9. The method of claim 1, further comprising querying the user to determine if an alteration type of the confidential information was appropriate.

10. The method of claim 9, further comprising storing, responsive to receiving confirmation input from the user that the alteration type was appropriate, a correlation between the alteration type and the output in a database.

11. An information handling device, comprising:
    a processor;
    a memory device that stores instructions executable by the processor to:
    receive an indication to provide output to a user;
    identify that the output comprises confidential information, wherein the confidential information comprises information previously designated as confidential by the user utilizing at least one content tagging technique;
    determine that the output may be heard by at least one other individual determined to be present in the user's surroundings;
    identify the at least one other individual present in the user's surrounding, wherein the identifying the at least one other individual comprises utilizing identification data to identify the at least one other individual and determining, utilizing permissions assigned to the at least one other individual by the user, if the at least one other individual is authorized to hear the confidential information; and
    alter, responsive to determining, based upon the assigned permissions, the at least one other individual is not authorized to hear the confidential information, the output to conceal the confidential information.

12. The information handling device of claim 11, wherein the indication is associated with at least one of a user command and a scheduled reminder.

13. The information handling device of claim 11, wherein the instructions executable by the processor to identify comprise instructions executable by the processor to access a stored list comprising a plurality of items of confidential information, and determine that the output comprises at least one item from the plurality of items.

14. The information handling device of claim 11, wherein the instructions executable by the processor to determine comprise instructions executable by the processor to receive data associated with the user's surroundings.

15. The information handling device of claim 14, wherein the data comprises at least one item of data selected from the group consisting of audio data, visual data, location data, calendar entry data, social media data, and proximate individual data.

16. The information handling device of claim 11, wherein the instructions executable by the processor to alter comprise instructions executable by the processor to adjust a length of the confidential information in the output.

17. The information handling device of claim 11, wherein the instructions executable by the processor to alter comprise instructions executable by the processor to provide the output on an output device personal to the user.

18. The information handling device of claim 11, wherein the instructions are further executable by the processor to query the user to determine if an alteration type of the confidential information was appropriate.

19. The information handling device of claim 18, wherein the instructions are further executable by the processor to store, responsive to receiving confirmation input from the user that the alteration type was appropriate, a correlation between the alteration type and the output in a database.

20. A product, comprising:
a storage device that stores code, the code being executable by a processor and comprising:
code that receives an indication to provide output;
code that identifies that the output comprises confidential information, wherein the confidential information comprises information previously designated as confidential by the user utilizing at least one content tagging technique;
code that determines that the output may be heard by at least one other individual determined to be present in the user's surroundings;
code that identifies the at least one other individual present in the user's surrounding, wherein the identifying the at least one other individual comprises utilizing identification data to identify the at least one other individual and determining, utilizing permissions assigned to the at least one other individual by the user, if the at least one other individual is authorized to hear the confidential information; and
code that alters, responsive to determining, based upon the assigned permissions, that the at least one other individual is not authorized to hear the confidential information, the output to conceal the confidential information.

* * * * *